(12) United States Patent
Amburgey

(10) Patent No.: US 10,704,855 B2
(45) Date of Patent: Jul. 7, 2020

(54) SYSTEM AND METHOD FOR TESTING FIREARM OPERATING CHARACTERISTICS

(71) Applicant: The University of North Carolina at Charlotte, Charlotte, NC (US)

(72) Inventor: James E. Amburgey, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 69 days.

(21) Appl. No.: 16/145,309

(22) Filed: Sep. 28, 2018

(65) Prior Publication Data

US 2019/0101351 A1 Apr. 4, 2019

Related U.S. Application Data

(60) Provisional application No. 62/565,219, filed on Sep. 29, 2017.

(51) Int. Cl.
*F41A 23/16* (2006.01)
*G01L 5/22* (2006.01)

(52) U.S. Cl.
CPC ............... *F41A 23/16* (2013.01); *G01L 5/22* (2013.01)

(58) Field of Classification Search
CPC .................................. F41A 23/16; G01L 5/22
USPC .................................................... 73/862.381
See application file for complete search history.

(56) References Cited

U.S. PATENT DOCUMENTS

| | | | |
|---|---|---|---|
| 5,402,678 A * | 4/1995 | Fritz | F41A 19/01 42/1.01 |
| 9,134,086 B2 * | 9/2015 | Lim | F41A 25/10 |
| 10,378,848 B1 * | 8/2019 | Galie | F41A 19/59 |

* cited by examiner

*Primary Examiner* — Octavia Hollington
(74) *Attorney, Agent, or Firm* — Clements Bernard Walker; Christopher L. Bernard

(57) ABSTRACT

A system and method for testing firearm operating characteristics are provided using a force testing apparatus coupled to all or a portion of the firearm. Of significance, the system and method are configured to test the interaction(s) of multiple firearm components during operation without a live round such that firearm component defects, manufacturing tolerance problems, misalignments, and the like can be discovered during or subsequent to manufacture and prior to use.

14 Claims, 3 Drawing Sheets

SYSTEM AND METHOD FOR TESTING FIREARM OPERATING CHARACTERISTICS

CROSS-REFERENCE TO RELATED APPLICATION

The present patent application/patent claims the benefit of priority of U.S. Provisional Patent Application No. 62/565,219, filed on Sep. 29, 2017, and entitled "SYSTEM AND METHOD FOR TESTING FIREARM OPERATING CHARACTERISTICS," the contents of which are incorporated in full by reference herein.

FIELD OF THE DISCLOSURE

The present disclosure relates generally to a system and method for testing firearm operating characteristics. More specifically, the present disclosure relates to a system and method for testing firearm operating characteristics using a force testing apparatus coupled to all or a portion of the firearm. Of significance, the system and method of the present disclosure are configured to test the interaction(s) of multiple firearm components during operation without a live round such that firearm component defects, manufacturing tolerance problems, misalignments, and the like can be discovered during or subsequent to manufacture and prior to use.

BACKGROUND OF THE DISCLOSURE

With regard to firearm and related testing, there are a number of conventional systems and methods for testing individual components for defects, testing springs through ranges of motion, measuring the force required to pull a trigger, assessing firing performance, and the like. For example, any individual components can be force tested for defects and there are trigger pull testers that plot force versus travel distance of a trigger. However, there are no known systems or methods for testing the action of a firearm, generally, but not exclusively, referring to the automatic loading/unloading of a cartridge as the bolt or slide of the firearm is cycled forward/backward. The trigger is normally pulled to cause the cycling of the slide after a round is fired.

Thus, what is still needed in the art is a system and method for testing the interaction(s) of multiple firearm components during operation without a live round such that firearm component defects, manufacturing tolerance problems, misalignments, and the like can be discovered during or subsequent to manufacture and prior to use. Additionally, what is still needed in the art is a system and method that can be used to monitor for and detect problems that develop over time due wear, deformation, corrosion, and/or abuse, as well as monitor the general readiness of a firearm for use in terms of cleanliness, buildup, and/or debris.

BRIEF SUMMARY OF THE DISCLOSURE

In various exemplary embodiments, the present disclosure provides a system and method for testing firearm operating characteristics using a force testing apparatus coupled to all or a portion of the firearm. The system and method of the present disclosure are configured to test the interaction(s) of multiple firearm components during operation without a live round such that firearm component defects, manufacturing tolerance problems, misalignments, and the like can be discovered during or subsequent to manufacture and prior to use. The force testing apparatus coupled to the firearm or firearm components is operable for measuring the relationship between force and travel distance as the firearm or firearm components are cycled through a given action. Firearm components can be added to or removed from the tested assembly to isolate individual effects and/or rule out potential problems.

Thus, firearm designs can be improved, manufacturing tolerances can be adjusted, manufacturers can troubleshoot defects and alignment problems, and/or quality control testing can be performed. For example, dummy rounds can be used during cycling to assess forces and travel distances during the feeding of a round. Likewise, trigger testing can be performed in conjunction with other firearm components. Firearms can be tested with or without springs to assess their impact on forces and travel distances while the firearm is cycled. Any suitable firearm actuation interaction(s) can thereby be tested and analyzed.

In one exemplary embodiment, the present disclosure provides a system for testing an operating characteristic of a firearm, including: a motorized testing apparatus including a first attachment mechanism configured to be coupled to a first firearm component and a second attachment mechanism configured to be coupled to a second firearm component, wherein the first firearm component is coupled to and moveable with respect to the second firearm component; wherein the motorized testing apparatus includes a motor operable for moving the first firearm component with respect to the second firearm component; and wherein the motorized testing apparatus is operable for measuring force versus travel distance data when the first firearm component is moved with respect to the second firearm component. Optionally, the first firearm component and the second firearm component are coupled to one or more additional firearm components. Optionally, the first firearm component and the second firearm component are coupled to one or more intervening firearm components. Optionally, one or more of the first attachment mechanism and the second attachment mechanism are rigidly attached to the respective one or more of the first firearm component and the second firearm component. Optionally, the first firearm component is coupled to and translatable with respect to the second firearm component, and wherein the motor is operable for translating the first firearm component with respect to the second firearm component. Optionally, the force versus travel distance data includes a force versus travel distance plot. The system also includes a software algorithm executing instructions stored in a memory operable for comparing the measured force versus travel distance data to baseline force versus travel distance data to identify one or more manufacturing defects, manufacturing tolerance problems, misalignments, and quality control issues with respect to one or more of the first firearm component, the second firearm component, and an additional firearm component coupled to the first firearm component and the second firearm component. Other sensors could be used to supplement and/or refine the function of the present invention, including, but not limited to, sensors that measure acceleration, velocity, gyroscopic stability in multiple dimensions, and sound (i.e., vibration).

In another exemplary embodiment, the present disclosure provides a method for testing an operating characteristic of a firearm, including: coupling a first attachment mechanism of a motorized testing apparatus to a first firearm component; coupling a second attachment mechanism of the motorized testing apparatus to a second firearm component; wherein the first firearm component is coupled to and moveable with respect to the second firearm component;

moving the first firearm component with respect to the second firearm component using a motor of the motorized testing apparatus; and measuring force versus travel distance data when the first firearm component is moved with respect to the second firearm component using the motorized testing apparatus. Optionally, the first firearm component and the second firearm component are coupled to one or more additional firearm components. Optionally, the first firearm component and the second firearm component are coupled to one or more intervening firearm components. Optionally, one or more of the first attachment mechanism and the second attachment mechanism are rigidly attached to the respective one or more of the first firearm component and the second firearm component. Optionally, the first firearm component is coupled to and translatable with respect to the second firearm component, and wherein the motor is operable for translating the first firearm component with respect to the second firearm component. Optionally, the force versus travel distance data includes a force versus travel distance plot. The method also includes comparing the measured force versus travel distance data to baseline force versus travel distance data to identify one or more manufacturing defects, manufacturing tolerance problems, misalignments, and quality control issues with respect to one or more of the first firearm component, the second firearm component, and an additional firearm component coupled to the first firearm component and the second firearm component. Again, other sensors could be used to supplement and/or refine the function of the present invention, including, but not limited to, sensors that measure acceleration, velocity, gyroscopic stability in multiple dimensions, and sound (i.e., vibration).

BRIEF DESCRIPTION OF THE DRAWINGS

The present disclosure is illustrated and described herein with reference to the various drawings in which like reference numbers are used to denote like system components/method steps, as appropriate, and in which.

DETAILED DESCRIPTION OF THE DISCLOSURE

Figure 1:
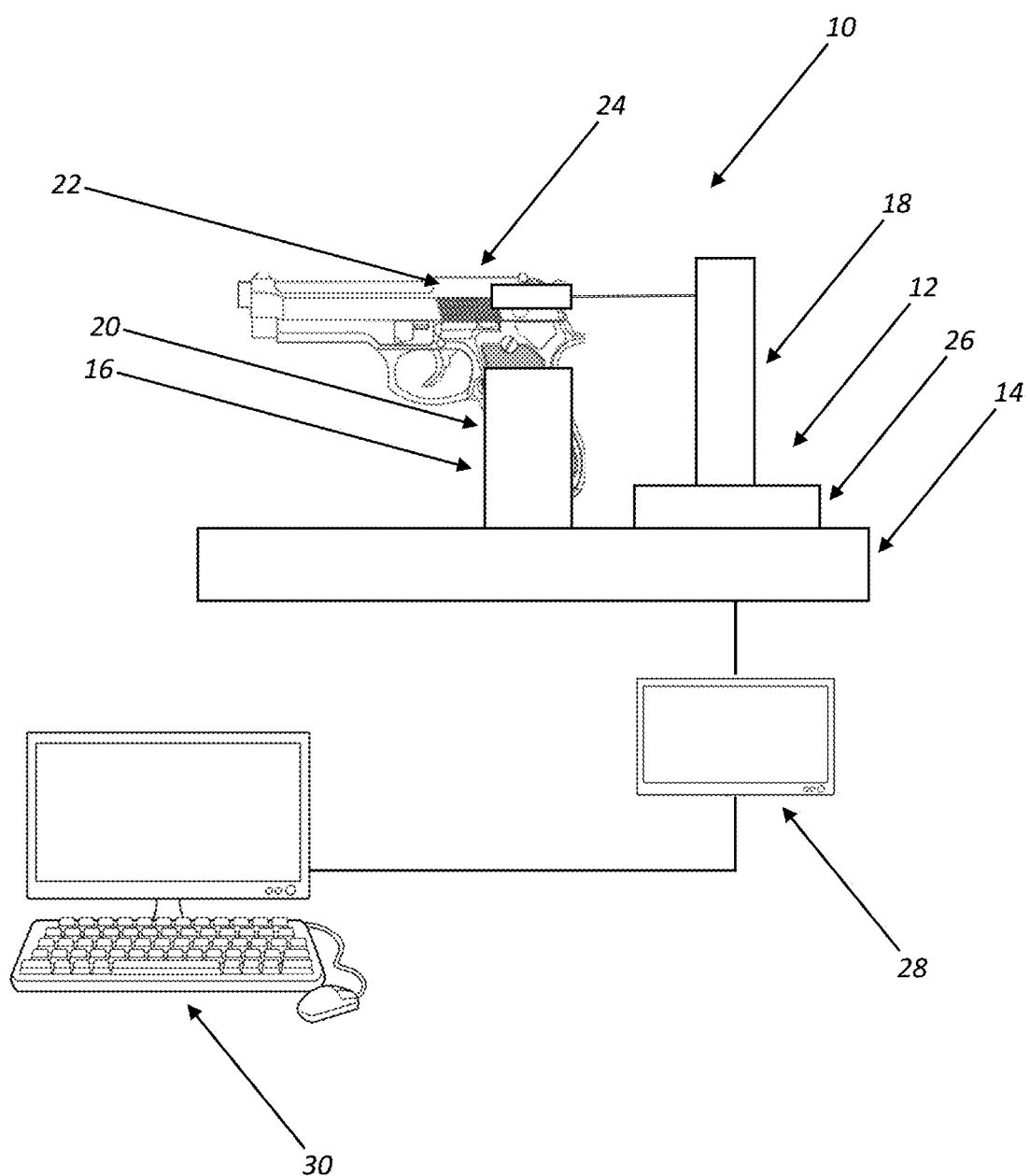
FIG. 1 is a schematic diagram illustrating one exemplary embodiment of the firearm operating characteristic testing system of the present disclosure.

Again, in various exemplary embodiments, the present disclosure provides a system and method for testing firearm operating characteristics using a force testing apparatus coupled to all or a portion of the firearm. The system and method of the present disclosure are configured to test the interaction(s) of multiple firearm components during operation without a live round such that firearm component defects, manufacturing tolerance problems, misalignments, and the like can be discovered during or subsequent to manufacture and prior to use. The force testing apparatus coupled to the firearm or firearm components is operable for measuring the relationship between force and travel distance as the firearm or firearm components are cycled through a given action. Firearm components can be added to or removed from the tested assembly to isolate individual effects and/or rule out potential problems.

Thus, firearm designs can be improved, manufacturing tolerances can be adjusted, manufacturers can troubleshoot defects and alignment problems, and/or quality control testing can be performed. For example, the method includes mounting a firearm in the motorized force measurement test stand via one or more fixtures that are firearm specific and measuring the force and travel distance as the motor cycles the action of the firearm (e.g., pulls the slide completely to the rear and/or allows it to return to the firing position). The data collected is then used to plot force versus displacement as the slide is cycled in either direction, with or without ammunition, springs, and/or various other components. The plots of each data series can be combined and used to identify problems quickly, accurately, and with reproducibility. For example, a bump within 0.080 inches of lockup (i.e., the firing position or point of zero displacement) on a model 1911 handgun could potentially involve the front of the barrel legs bumping into the slide stop cross pin, while a similar bump at 0.095 inches could be the result of a high spot in the slide or frame rails. A bump at 0.065 inches could be the result of the barrel riding on the link pin due to an improperly sized link, and all three of these scenarios could produce dangerous reliability problems, product returns, and repairs under warranty. Firearm manufacturers stand to benefit significantly from a test procedure that accurately and reliably diagnoses problems with firearms before they leave the factory or fire their first round. With large numbers of firearms having known problems and product returns being a significant cost for manufacturers, the apparatus and process disclosed could offer significant financial advantages to users.

The test method includes at least one measurement of force versus travel distance using a motorized force test stand (or equivalent testing equipment) as the action of the mounted firearm is opened and/or closed. The data produced are plotted and/or analyzed numerically to evaluate the fit or function of a firearm.

Referring now specifically to FIG. 1, in one exemplary embodiment, the firearm testing system 10 of the present invention includes a motorized testing apparatus 12 including a stage or other suitable base 14, a first attachment mechanism 16, and a second attachment mechanism 18. Preferably, the first attachment mechanism 16 is coupled to a first component 20 of a firearm 24 under test and the second attachment mechanism 18 is coupled to a second component 22 of the firearm 24 under test. In the exemplary embodiment illustrated, the first attachment mechanism 16 is secured to the handle of the firearm 24, while the second attachment mechanism 18 is secured to the slide of the firearm 24. Each of these connections may be rigid, pivotable, or otherwise movable, as a given application dictates, as each firearm 24 can utilize a tailored connection mechanism. It will be readily apparent to those of ordinary skill in the art that additional attachment mechanisms can be utilized and connect to different/additional components of the firearm 24. Further, the firearm may include additional components disposed between/within the first component 20 and the second component 22, such as additional mechanical structures, springs, etc. In general, the first attachment mechanism 16 and second attachment mechanism 18 are moveable (e.g., translatable) with respect to one another, corresponding to the first component 20 and the second component 24 being moveable (e.g., translatable) with respect to one another. Preferably, one or more of the first attachment mechanism 16 and the second attachment mechanism 18 are coupled to a motor 26 that is operable for selectively actuating the first attachment mechanism 16 and or the second attachment mechanism 18 and, correspondingly, the first component 20 and the second component 22. In the exemplary embodiment illustrated, the motor 26 is coupled to the second attachment mechanism 18 and the second component 22, while the first attachment mechanism 16 and the first component 20 are held substantially rigidly by the stage or base 14. Thus, the motor 26 is selectively actuated to actuate the second component (e.g., the slide) with respect to the first component (e.g., the handle and body) of the firearm 24.

When the first component 20 and the second component 22 of the firearm 24 are actuated with respect to one another, via actuation of the first attachment mechanism 16 with respect to the second actuation mechanism 18, the data collection 28 and processing systems 30 of the system 10 operate to collect precise force and travel distance information from the actuation, such that the precise movements and interactions of the various intervening components can be acquired and analyzed to uncover component defects, manufacturing tolerance problems, misalignments, and the like. Such force and travel distance data acquisition, in general, is well known to those of ordinary skill in the art, although not in this type of application. The system 10 includes a software algorithm executing instructions stored in a memory operable for comparing the measured force versus travel distance data to baseline force versus travel distance data to identify one or more manufacturing defects, manufacturing tolerance problems, misalignments, and quality control issues with respect to one or more of the first firearm component 20, the second firearm component 22, and an additional firearm component coupled to the first firearm component 20 and the second firearm component 22.

Figure 2:
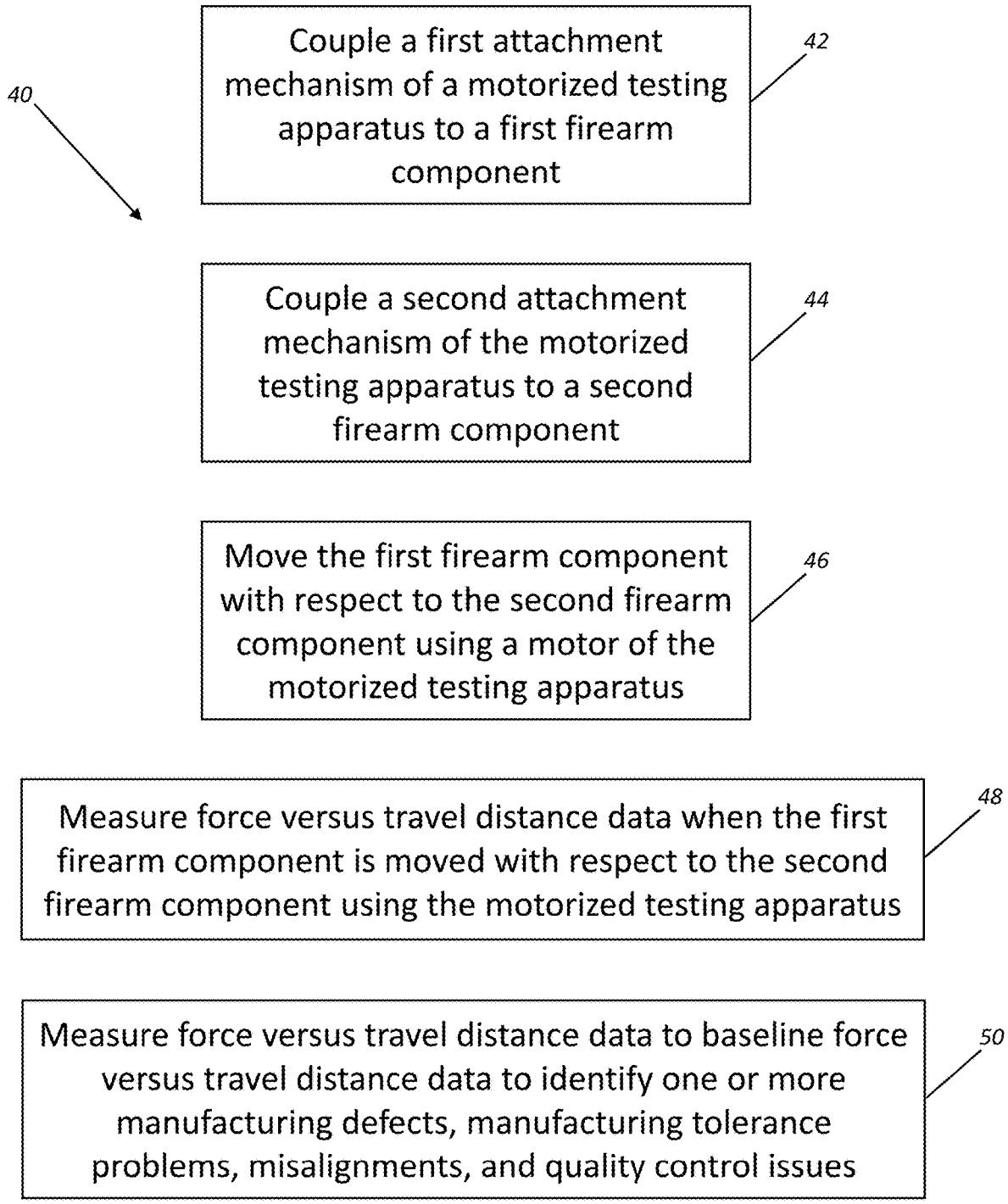
FIG. 2 is a flowchart illustrating one exemplary embodiment of the firearm operating characteristic testing method of the present disclosure.

Referring now specifically to FIG. 2, in another exemplary embodiment, a method 40 for testing an operating characteristic of a firearm 24, includes: coupling a first attachment mechanism 16 of a motorized testing apparatus 12 to a first firearm component 20 (step 42); coupling a second attachment mechanism 18 of the motorized testing apparatus 12 to a second firearm component 22 (step 44); wherein the first firearm component 20 is coupled to and moveable with respect to the second firearm component 22; moving the first firearm component 20 with respect to the second firearm component 22 using a motor 26 of the motorized testing apparatus 12 (step 46); and measuring force versus travel distance data when the first firearm component 20 is moved with respect to the second firearm component 22 using the motorized testing apparatus 12 (step 48). Optionally, the first firearm component 20 and the second firearm component 22 are coupled to one or more additional firearm components. Optionally, the first firearm component 20 and the second firearm component 22 are coupled to one or more intervening firearm components. Optionally, one or more of the first attachment mechanism 16 and the second attachment mechanism 18 are rigidly attached to the respective one or more of the first firearm component 20 and the second firearm component 22. Optionally, the first firearm component 20 is coupled to and translatable with respect to the second firearm component 22, and wherein the motor 26 is operable for translating the first firearm component 20 with respect to the second firearm component 22. Optionally, the force versus travel distance data includes a force versus travel distance plot. The method 40 also includes comparing the measured force versus travel distance data to baseline force versus travel distance data to identify one or more manufacturing defects, manufacturing tolerance problems, misalignments, and quality control issues with respect to one or more of the first firearm component 20, the second firearm component 22, and an additional firearm component coupled to the first firearm component 20 and the second firearm component 22 (step 50).

Figure 3:
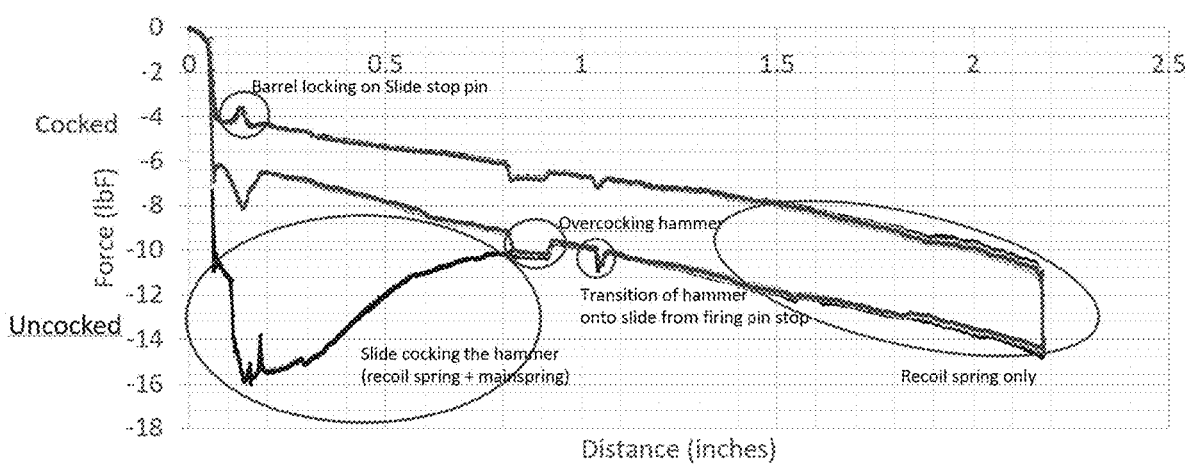
FIG. 3 is a series of plots illustrating force versus travel distance curves for an assembled firearm highlighting perturbations associated with various actions/problems obtained using the system and method of the present disclosure—specifically cycling the slide of a 1911 pistol with a 13-lb recoil spring and a 19-lb mainspring.

FIG. 3 is a series of plots illustrating force versus travel distance curves for an assembled firearm highlighting perturbations associated with various actions/problems obtained using the system and method of the present disclosure—specifically cycling the slide of a 1911 pistol with a 13-lb recoil spring and a 19-lb mainspring.

Thus, the present disclosure provides precise and detailed data regarding changes in force and when/where they occur as the action of a firearm is cycled. The magnitude of the changes in force corresponds with their significance, and the location of the changes in force corresponds with their cause(s). The ability to collect precise data from the same test repeatedly with different parts (and/or parts being added/removed) allows the user to determine the source of a problem and subsequently verify its resolution.

The system can test combinations of magazines and ammunition, for example, in a variety of firearms. The system can evaluate the quality of a barrel fit, the accuracy of link size, or the suitability of a particular brand of magazine with a chosen ammunition, for example. The bushing fit, slide-to-frame play, and even the quality of the polishing on a feed ramp can be quantitatively assessed. Repeated testing can reveal intermittent problems. For example, if the sides of the barrel hood hit the slide only once in every ten cycles, then a single test might miss this problem. Testing a variety of springs can show the margin of error present with multiple component options. The same equipment can also be used to collect more accurate test results related to current testing procedures, like measuring trigger pull weight or testing springs for batch-to-batch variability. It could also be possible to set up the equipment to test individual components (e.g., barrel bushings on a fixed size barrel) or subsystems (e.g., an assembled mainspring housing). The fit of the trigger in the trigger track, the magazine in the magwell, or the engagement of the hammer by the sear are all additional tests that could be considered by users using the system of the present disclosure, among numerous others.

Although the present disclosure is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present disclosure, are contemplated thereby, and are intended to be covered by the following non-limiting claims for all purposes and without limitation.

What is claimed is:

1. A system for testing an operating characteristic of a firearm, comprising:
 a motorized testing apparatus comprising a first attachment mechanism configured to be coupled to a first firearm component and a second attachment mechanism configured to be coupled to a second firearm component, wherein the first firearm component is coupled to and moveable with respect to the second firearm component, and wherein the first firearm component comprises one of a handle and a body of the firearm and the second firearm component comprises one of a slide and bolt of the firearm;

wherein the motorized testing apparatus comprises a motor operable for moving the first firearm component with respect to the second firearm component; and wherein the motorized testing apparatus is operable for measuring force versus travel distance data when the first firearm component is moved with respect to the second firearm component.

2. The system of claim 1, wherein the first firearm component and the second firearm component are coupled to one or more additional firearm components.

3. The system of claim 1, wherein the first firearm component and the second firearm component are coupled to one or more intervening firearm components.

4. The system of claim 1, wherein one or more of the first attachment mechanism and the second attachment mechanism are rigidly attached to the respective one or more of the first firearm component and the second firearm component.

5. The system of claim 1, wherein the first firearm component is coupled to and translatable with respect to the second firearm component, and wherein the motor is operable for translating the first firearm component with respect to the second firearm component.

6. The system of claim 1, wherein the force versus travel distance data comprises a force versus travel distance plot.

7. The system of claim 1, further comprising a software algorithm executing instructions stored in a memory operable for comparing the measured force versus travel distance data to baseline force versus travel distance data to identify one or more manufacturing defects, manufacturing tolerance problems, misalignments, and quality control issues with respect to one or more of the first firearm component, the second firearm component, and an additional firearm component coupled to the first firearm component and the second firearm component.

8. A method for testing an operating characteristic of a firearm, comprising:

coupling a first attachment mechanism of a motorized testing apparatus to a first firearm component;

coupling a second attachment mechanism of the motorized testing apparatus to a second firearm component;

wherein the first firearm component is coupled to and moveable with respect to the second firearm component, and wherein the first firearm component comprises one of a handle and a body of the firearm and the second firearm component comprises one of a slide and bolt of the firearm;

moving the first firearm component with respect to the second firearm component using a motor of the motorized testing apparatus; and measuring force versus travel distance data when the first firearm component is moved with respect to the second firearm component using the motorized testing apparatus.

9. The method of claim 8, wherein the first firearm component and the second firearm component are coupled to one or more additional firearm components.

10. The method of claim 8, wherein the first firearm component and the second firearm component are coupled to one or more intervening firearm components.

11. The method of claim 8, wherein one or more of the first attachment mechanism and the second attachment mechanism are rigidly attached to the respective one or more of the first firearm component and the second firearm component.

12. The method of claim 8, wherein the first firearm component is coupled to and translatable with respect to the second firearm component, and wherein the motor is operable for translating the first firearm component with respect to the second firearm component.

13. The method of claim 8, wherein the force versus travel distance data comprises a force versus travel distance plot.

14. The method of claim 8, further comprising comparing the measured force versus travel distance data to baseline force versus travel distance data to identify one or more manufacturing defects, manufacturing tolerance problems, misalignments, and quality control issues with respect to one or more of the first firearm component, the second firearm component, and an additional firearm component coupled to the first firearm component and the second firearm component.

* * * * *